Figure 1:
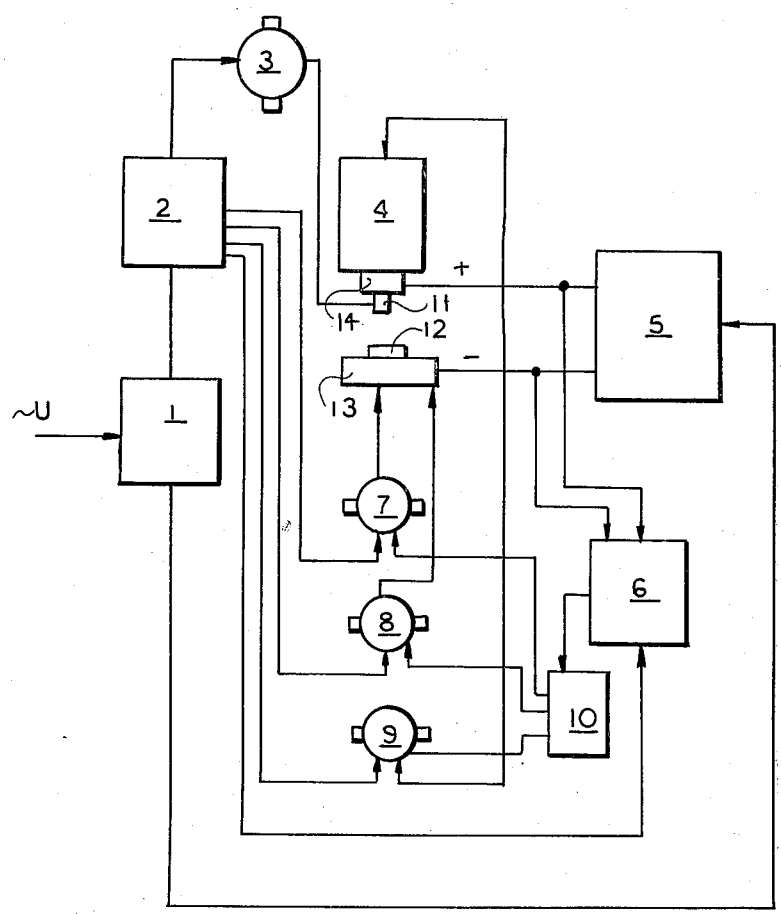

United States Patent [19]

Antonov et al.

[11] 4,226,697
[45] Oct. 7, 1980

[54] APPARATUS FOR THE SPARK DEPOSITION OF METALS

[75] Inventors: Bogomil T. Antonov; Stoyan Y. Panayotov; Ognyan V. Lyutakov, all of Sofia, Bulgaria

[73] Assignee: BRV "Electronna Obrabotka na Materialite", Sofia, Bulgaria

[21] Appl. No.: 964,255

[22] Filed: Nov. 28, 1978

[30] Foreign Application Priority Data

Nov. 29, 1977 [BG] Bulgaria ................................ 37901

[51] Int. Cl.² ............................................. B23K 9/04
[52] U.S. Cl. ................................. 204/298; 219/76.13
[58] Field of Search ......................... 204/192 R, 298; 219/76.13, 69 G, 69 M, 69 W

[56] References Cited

U.S. PATENT DOCUMENTS

| | | | |
|---|---|---|---|
| 3,581,045 | 5/1971 | Panschow | 219/69 W |
| 3,731,045 | 5/1973 | Ullmann et al. | 219/69 W |
| 3,832,514 | 8/1974 | Antonov | 219/76 |
| 4,051,422 | 9/1977 | Lavrentiev et al. | 219/69 W |
| 4,081,652 | 3/1978 | Jänicke et al. | 219/69 W |

Primary Examiner—John H. Mack
Assistant Examiner—William Leader

[57] ABSTRACT

There is disclosed an apparatus for the electric spark deposition of metals. The apparatus comprises a logic block, the input of which is connected to the output of a following system, a motor for horizontal motion in the x-direction and a motor for horizontal motion in the y-direction, such motors being connected by their inputs to a command unit and by their outputs to the movable table of the deposition apparatus; the motor for horizontal motion in the x-direction, the motor for horizontal motion in the y-direction and the motor for vertical motion are connected, respectively, to one of the outputs of the logic block. The advantages of the apparatus of the present invention are that it is provided with an electronic control of the motors for the horizontal and vertical motions of the depositing electrode-anode, which permits the total automation of the process of electric spark deposition onto workpieces, as well as the regulation of the inclination of the depositing head with respect to the vertical plane. Moreover, this device permits the maintenance of a working gap between the forming surface of the depositing electrode-anode and the deposited material; this makes possible deposition in a horizontal plane along coordinate axes ±x and ±y and depositing onto internal and inclined surfaces.

1 Claim, 2 Drawing Figures

APPARATUS FOR THE SPARK DEPOSITION OF METALS

This invention relates to an apparatus for the electric spark deposition of metals, which can be used for applying hard alloys of high wear resistance onto vertical and inclined working surfaces of metal-cutting and metal-working tools, components, materials, etc.

An apparatus for the electric spark deposition of metals is known which comprises an electrical supply block connected to an impulse generator and to the motor of a spindle which carriers a depositing electrode-anode. One of the outputs of the impulse generator is connected to a handle for the depositing electrode-anode, while its other output is connected to the workpiece being treated. This device effects a rotational method of deposition, wherein the depositing electrode-anode is shaped like a rotating brush or disc and is moved manually by an operator. The output voltage is varied in 12 stages within the limits of 6 and 20 V, while the capacity is regulated in 10 stages and its resistance is regulated in 4 stages. The drawbacks of this device are that it does not permit a uniform and smooth application of the deposited metal because of the manual displacement of the depositing electrode-anode, it cannot be used for the application of local coatings onto surfaces of small size, and its productivity is low.

Further known is a device for the electric spark deposition of metals, which is connected to a deposition apparatus. It comprises a supply unit, one of the outputs of which is connected through a command unit to the motor of the spindle carrying the depositing electrode-anode, while the other output of the supply unit is connected to an impulse generator. The positive and the negative outputs of the impulse generator are connected, respectively, to the current supply unit and to the movable table of the deposition machine, while at the same time they are connected to a following system, the input of which is connected to one of the outputs of the command unit. Moreover, between another of the outputs of the command unit and the depositing head of the machine there is connected a motor for the vertical motion of the depositing electrode-anode. Between the movable table and the command block there is connected a unit for electromechanical control. The drawback of this device lies in the impossibility of coating working surfaces which are inclined with respect to the face of the depositing electrode-anode or are parallel to its length.

It is, therefore, a general object of this invention to provide a device for the electric spark deposition of metals, which permits the deposition onto working surfaces which are inclined with respect to the face of the depositing electrode-anode or are parallel to its length.

This object is achieved by an apparatus for electric spark deposition, which comprises a logic block, the input of which is connected to the output of a following system, a motor for horizontal motion in the x-direction, and a motor for horizontal motion in the y-direction, the motors being connected with their inputs to a command unit and with their ouputs to the movable table of the deposition apparatus. The motor for horizontal motion in the x-direction, the motor for horizontal motion in the y-direction and a motor for vertical motion are connected, respectively, to one of the outputs of the logic block.

By the terms "following" and "conditions of following" used herein there is meant:

One of the parameters of the electric spark layering process is determined as basic and one of its values is determined as a constant. This value of the parameter is transferred to the following system, comprised of a sensor for measuring the value of said parameter, a logic block and performing mechanism. When a deviation from the determined value of the basic parameter occurs, the logic block on receiving the signal, gives a command to the performing mechanism, which on its turn performs displacement along the axes x or y or z. The task of the following system is to keep a determined distance between the layering electrode and the layered workpiece.

The meaning of the term "following" is, that as a result of the keeping of constant distance between the layering electrode and the layered workpiece, the layering electrode follows the microgeometry of the layered workpiece surface.

"Regime of following" or "conditions of following" means that there is working a following system, that keeps the required distance between the layering system and the layered workpiece; these terms are synomynous with the term "automatic regime".

The advantages of the apparatus of the present invention lie in that it is provided with an electronic control of the motors for horizontal motion of the movable table and vertical motion of the depositing electrode-anode; this permits the total automation of the process of electric spark metal deposition onto workpieces, as well as the regulation of the inclination of the depositing head with respect to a vertical plane. Moreover, this apparatus permits the mainenance of a working gap between the forming surface of the depositing electrode-anode and the deposited metal; this makes possible deposition in a horizontal plane along coordinate axes $\pm x$ and $\pm y$, and the depositing onto internal and inclined surfaces.

For a better understanding of the invention, reference should be made to the accompanying drawings, in which there is illustrated a preferred embodiment of the invention.

Figure 2:
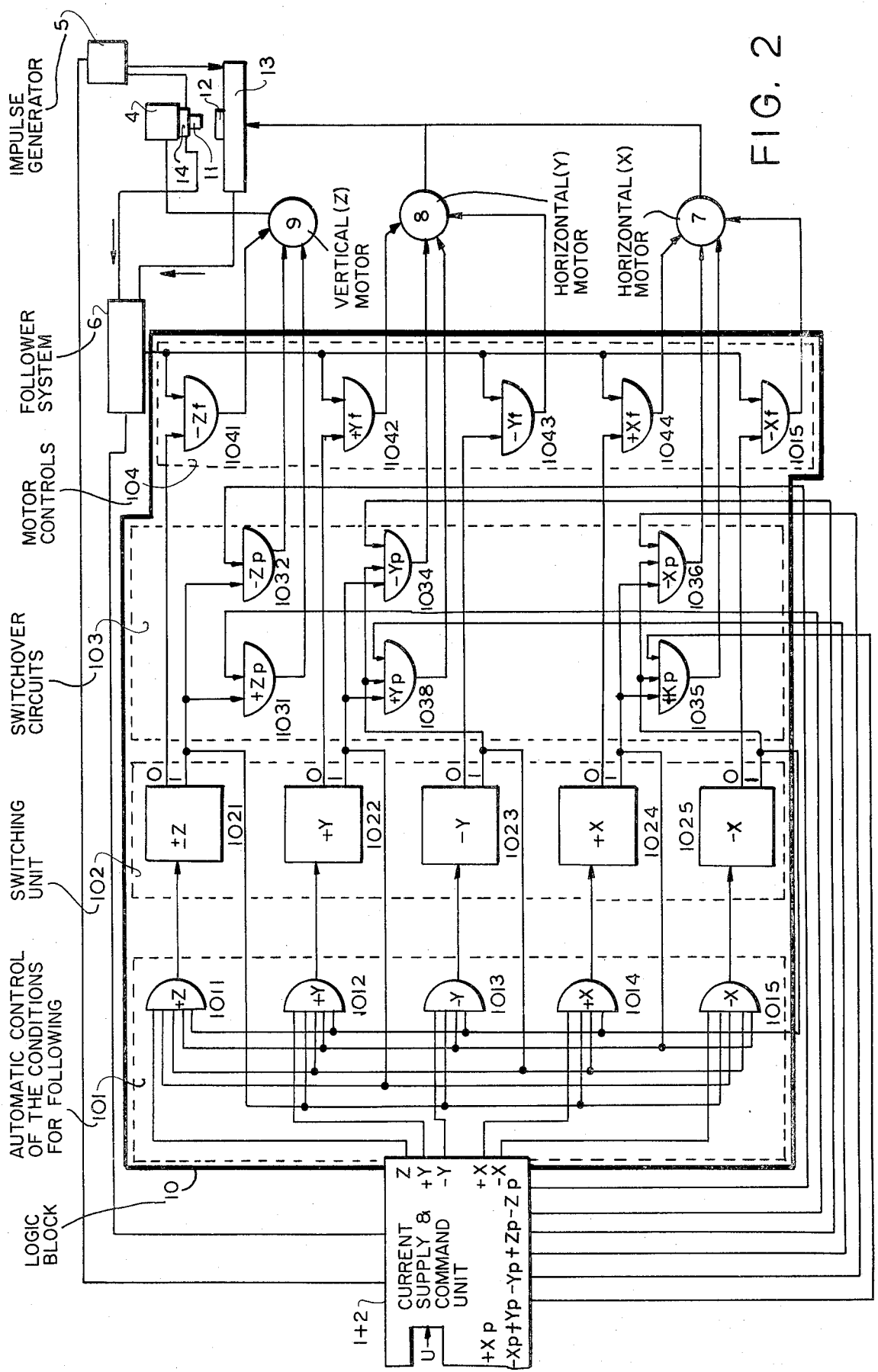

In the drawings:

FIG. 1 is an electrical diagram of the apparatus of the invention, connected to a deposition machine; and FIG. 2 is a circuit diagram illustrating the units of the apparatus; in this figure elements 1 and 2 of FIG. 1 are shown combined in a single block "1±2".

As shown in FIG. 1, the device of the invention for electric spark deposition of metals comprises an electrical supply unit 1 for the control system, one of the outputs of which is fed through a command unit 2 to the motor 3 driving the spindle to the depositing head 4, as well as an impulse generator 5, whose outputs are connected to a following system 6, which controls the motor for horizontal motion in the x-direction 7, the motor for horizontal motion in a y-direction 8 and the motor 9 for vertical motion, by means of a logic block 10. The device for deposition is illustrated partially by its component elements shown in FIG. 1 mainly in block form. The depositing electrode-anode 11 is carried by a spindle and is disposed over the workpiece 12, which acts as a cathode and is placed on the movable table 13; between the depositing head 4 and the depositing electrode-anode 11 there is provided a second supply unit 14 for supplying electrode-melting current to the electrode.

The operation of the device for electric spark deposition is as follows. It is supplied by a three-phase voltage, and the command unit 2 gives commands for the automatic operation of the actuating motors for horizontal motion in the x- and y-directions 7, 8 and the motor 9 for vertical motion in following, and gives commands for operation of the motors during motion or stopping of the apparatus. The command unit 2 also gives the command for switching on the motor 3 for the spindle, to which the depositing electrode-anode 11 is attached.

The apparatus operates basically in two conditions: (a) automatic (condition of following), in which the process of electric spark metal deposition is automatically effected, and (b) manual, in which the positioning of the depositing head 4 or the displacement of the deposited workpiece 12 by means of the movable table 13 by the motors for horizontal motion in the x- and y-directions are effected. The logic block 10, a feature of the apparatus, gives permission for switching on each of the actuating motors 7, 8 for horizontal motion in the x- and y-directions and also of the motor 9 for vertical motion under conditions of following or of manual displacement. Thus, the possibility for applying coatings in a z-direction by means of the motor 9 for vertical motion, as well as in the ±x and ±y-directions by means of the motors 7, 8 for horizontal motion in the x- and y-directions is realized. By means of the regulable depositing head 4, which provides a possibility for motion in the (+) and (−) directions with respect to the vertical axis of the depositing electrode-anode 11, it is possible to realize a deposition also onto inclined working surfaces.

The energy necessary for performing the process of electric spark deposition is supplied by the impulse generator 5, the positive output of which is connected to the current-supply unit 14 attached to the depositing head 4, while its negative output is connected to the movable table 13, onto which the workpiece 12 is fastened.

A necessary condition for the correct course of the process of local electric spark deposition is the rotational motion of the depositing electrode-anode 11, which is effected by means of the motor 3 for driving the spindle. In this case the motor 3 for the spindle is electronically controlled and its revolutions are stabilized in the range of 600 to 6000 min$^{-1}$. For maintaining an optimum distance between the depositing electrode-anode 11 and the deposited workpiece 12, for the realization of an electric spark discharge and a correct course of the process of electric arc deposition, there is provided the following system 6, which processes the signal taken from the air gap, and by means of logic block 10 there is given a command for reaction of the actuating motors for horizontal motion in the x- and the y-directions by motors 7 and 8, respectively, or of the motor 9 for vertical motion.

The schematic construction of logic block 10 and its connection to the other blocks of the device are illustrated in detail in FIG. 2. As noted above, elements 1 and 2 of FIG. 1 are shown in FIG. 2 combined in a single block "1±2". The command block 2 there shown allows the giving of five commands for operation of the motors in the condition of following, and six commands for the operation of the motors in condition of manual operation.

The commands for the automatic operation of the actuating motors for horizontal motion in the x- and y-directions 7, 8 and the motor 9 for vertical motion in the condition of following are fed through the bars z, +y, −y, +x, −x of command block 2, such bars corresponding to the coordinate directions. The commands for manual operation of the actuating motors for horizontal motion in the x- and y-directions 7, 8 and the motor 9 for vertical motion are fed through the bars +$x_p$, −$x_p$, +$y_p$, +$z_p$, −$z_p$, which also correspond to the coordinate directions. The commands for the displacement of the movable table 13 in the condition of manual operation are used for positioning the workpiece 12 with respect to the depositing electrode-anode 11 before the start of the process and for displacing the workpiece 12 during the deposition. The four translational commands in the directions ±x and ±y can be given individually, as well as in combination, and in the latter case the deposited strip describes a preset contour.

The commands for the manual displacement of the depositing head 4 in direction of the coordinate axis ±z, performed by the motor 9 for vertical motion, are used for transferred the depositing head 4 and the depositing electrode-anode 11, respectively, towards the workpiece 12 for positioning the depositing electrode-anode 11 when depositing layers onto internal and external inclined and vertical surfaces.

The logic block 10 of the device is built-up of several units: a unit 101 for the automatic control of the condition of following, composed of a build-up of five AND circuits 1011–1015, respectively, for following in the −x, +x, −y, +y and z-directions, a switching unit 102, composed of a build-up of five switchover circuits 1021–1025 corresponding to the coordinate directions ±x, ±y, ±z, a unit 103 for the control of the actuating motors in the manual operation condition consisting of six AND circuits 1031–1036 and permitting a displacement in the corresponding coordinate directions; and a unit 104 permitting the operation of the motors in the conditions of following, composed of a build-up of five AND circuits 1041–1045.

The operation of units 101 to 104 and their interconnections are shown in FIG. 2. The switching units and the coincidence circuits can be of electromechanical design having relay contacts, or of a discrete or integral type.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In an apparatus for the electric spark deposition of metals upon a workpiece, the apparatus having a table movable in the x and y directions receiving the workpiece upon which the metal is to be deposited, and a rotatable depositing electrode-anode, the improvement which comprises a command unit to supply commands for the operation of the motors during motion or stopping of the apparatus, an impulse generator, first and second current supply units, a following system to determine any deviation in a predetermined distance between the electrode-anode and the workpiece a logic block to allow the switching on of each of the activating motors in response to a signal from the following system, means including a first electric motor for moving the depositing electrode-anode vertically, means including second and third electric motors for moving the table horizontally in the x- and y-directions, respectively, means including a fourth motor for rotating the electrode-anode, a first one of the outputs of the first current supply unit being connected to the command unit, a second output of the first current supply unit being connected to the impulse generator; the impulse generator having positive and negative outputs connected correspondingly to the second current supply unit and the moveable table of the apparatus and also to the following system; a second input of the following system being connected to one of the outputs of the command unit; the command unit having additional outputs connected to the first motor for producing the vertical motion of the depositing electrode-anode and the depositing head of the apparatus, the second motor for driving the table in the x-direction and the third motor for driving the table in the y-direction; the logic block selectively switching on each of the first, second, and third motors, said logic block having an input which is connected to the output of the following system; the second motor for the horizontal movement of the table in the x-direction, the third motor for the horizontal movement of the table in the y-direction, and the first motor for the vertical motion of the electrode-anode being additionally connected to respective ones of the outputs of the logic block.

* * * * *